United States Patent
Zheng

(10) Patent No.: US 8,839,504 B2
(45) Date of Patent: Sep. 23, 2014

(54) METHOD OF FABRICATING A DEVICE HAVING A SIDEGAP

(75) Inventor: Yi Zheng, San Ramon, CA (US)

(73) Assignee: HGST Netherlands B.V., Amsterdam (NL)

( * ) Notice: Subject to any disclaimer, the term of this patent is extended or adjusted under 35 U.S.C. 154(b) by 1479 days.

(21) Appl. No.: 12/120,129

(22) Filed: May 13, 2008

(65) Prior Publication Data

US 2009/0284867 A1    Nov. 19, 2009

(51) Int. Cl.
G11B 5/33 (2006.01)
B44C 1/22 (2006.01)
G11B 5/31 (2006.01)
G11B 5/127 (2006.01)

(52) U.S. Cl.
CPC ............ G11B 5/3163 (2013.01); G11B 5/1278 (2013.01); G11B 5/3116 (2013.01)
USPC .................. 29/603.12; 29/603.16; 29/603.23; 29/603.15; 216/22; 216/41; 360/126

(58) Field of Classification Search
USPC .............. 29/603.12, 603.13, 603.16, 603.18, 29/603.23, 603.24, 603.25, 603.15; 216/41, 51, 22; 257/295; 360/126
See application file for complete search history.

(56) References Cited

U.S. PATENT DOCUMENTS

| 5,059,278 A * | 10/1991 | Cohen et al. |
| 6,184,142 B1 * | 2/2001 | Chung et al. |
| 6,524,491 B1 * | 2/2003 | Liu et al. ......................... 216/22 |
| 6,664,578 B2 * | 12/2003 | Lee et al. ....................... 257/295 |
| 6,835,417 B2 | 12/2004 | Saenger et al. |
| 7,137,191 B2 * | 11/2006 | Sato et al. ................... 29/603.12 |
| 7,244,683 B2 | 7/2007 | Chung et al. ................... 438/758 |
| 2002/0036873 A1 * | 3/2002 | Hara et al. ................. 29/603.15 |
| 2004/0151845 A1 | 8/2004 | Nguyen et al. ................ 427/569 |
| 2006/0044681 A1 * | 3/2006 | Le et al. ......................... 360/126 |
| 2006/0044682 A1 | 3/2006 | Le et al. ......................... 360/126 |
| 2006/0174474 A1 | 8/2006 | Le ............... 29/603.12 |
| 2006/0223300 A1 | 10/2006 | Simka et al. .................. 438/618 |
| 2007/0247749 A1 | 10/2007 | Bonhote et al. ............... 360/126 |

FOREIGN PATENT DOCUMENTS

JP    2004014578 A  *  1/2004
JP    2009266331 A  * 11/2009

* cited by examiner

*Primary Examiner* — A. Dexter Tugbang
(74) *Attorney, Agent, or Firm* — Zilka-Kotab, PC

(57) ABSTRACT

A method in one approach includes forming a first layer of a nonmagnetic material over two sides of a structure, the first layer being substantially absent from above a top of the structure; depositing an overlayer of an etchable, nonmagnetic material over the first layer and the top of the structure; and etching the overlayer for substantially removing the overlayer from above the top of the structure, wherein a substantial portion of the overlayer remains along the two sides of the structure after the etching. Additional systems and methods are also presented.

16 Claims, 13 Drawing Sheets

METHOD OF FABRICATING A DEVICE HAVING A SIDEGAP

FIELD OF THE INVENTION

The present invention relates to thin film processing, and more particularly, this invention relates to sidegaps and methods of formation thereof.

BACKGROUND OF THE INVENTION

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

SUMMARY OF THE INVENTION

A method in one approach includes forming a first layer of a nonmagnetic material over two sides of a structure, the first layer being substantially absent from above a top of the structure; depositing an overlayer of an etchable, nonmagnetic material over the first layer and the top of the structure; and etching the overlayer for substantially removing the overlayer from above the top of the structure, wherein a substantial portion of the overlayer remains along the two sides of the structure after the etching.

A method in another approach includes forming a first layer of a nonmagnetic material over two sides of a structure, the first layer being substantially absent from above a top of the structure; depositing an overlayer of a millable, nonmagnetic material over the first layer and the top of the structure; and milling the overlayer for substantially removing the overlayer from above the top of the structure, wherein a substantial portion of the overlayer remains along the two sides of the structure after the milling.

A device in one embodiment includes a pole; a first layer of a nonmagnetic material over two sides of the pole, the first layer being substantially absent from above a top of the pole; and an overlayer of an etchable or millable material positioned along the two sides of the pole, the overlayer being substantially absent from above the top of the pole, wherein a ratio of a thickness of the first layer to a thickness of the overlayer is less than about 5:1.

A magnetic storage system in one embodiment includes magnetic media; and at least one head for reading from and writing to the magnetic media, each head having: a writer. The writer comprises a pole; a first layer of a nonmagnetic material over two sides of the pole, the first layer being substantially absent from above a top of the pole; and an overlayer of an etchable or millable material positioned along the two sides of the pole, the overlayer being substantially absent from above the top of the pole, wherein a ratio of a thickness of the first layer to a thickness of the overlayer is less than about 5:1. The system further includes a slider for supporting the head; and a control unit coupled to the head for controlling operation of the head.

Other embodiments of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 1.

FIG. 2C is a magnetic recording medium utilizing a perpendicular recording format.

FIG. 2D is a schematic representation of a recording head, and recording medium combination for perpendicular recording on one side.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of thin film fabrication methods, as well as resultant structures formed therefrom including components for magnetic storage systems.

While much of the following description will describe fabrication of a pole for a perpendicular magnetic writer, it should be understood that this is done by way of example only, and the teachings herein have broad application to thin film processing in all areas.

In one general embodiment, a method comprises forming a first layer of a nonmagnetic material over two sides of a structure, the first layer being substantially absent from above a top of the structure; depositing an overlayer of an etchable, nonmagnetic material over the first layer and the top of the structure; etching the overlayer for substantially removing the overlayer from above the top of the structure, wherein a substantial portion of the overlayer remains along the two sides of the structure after the etching.

In another general embodiment, a method comprises forming a first layer of a nonmagnetic material over two sides of a structure, the first layer being substantially absent from above a top of the structure; depositing an overlayer of a millable, nonmagnetic material over the first layer and the top of the structure; milling the overlayer for substantially removing the overlayer from above the top of the structure, wherein a substantial portion of the overlayer remains along the two sides of the structure after the milling.

In another general embodiment, a device comprises a pole; a first layer of a nonmagnetic material over two sides of the pole, the first layer being substantially absent from above a top of the pole; an overlayer of an etchable or millable material positioned along the two sides of the pole, the overlayer being substantially absent from above the top of the pole, wherein a ratio of a thickness of the first layer to a thickness of the overlayer is less than about 5:1.

Figure 1:
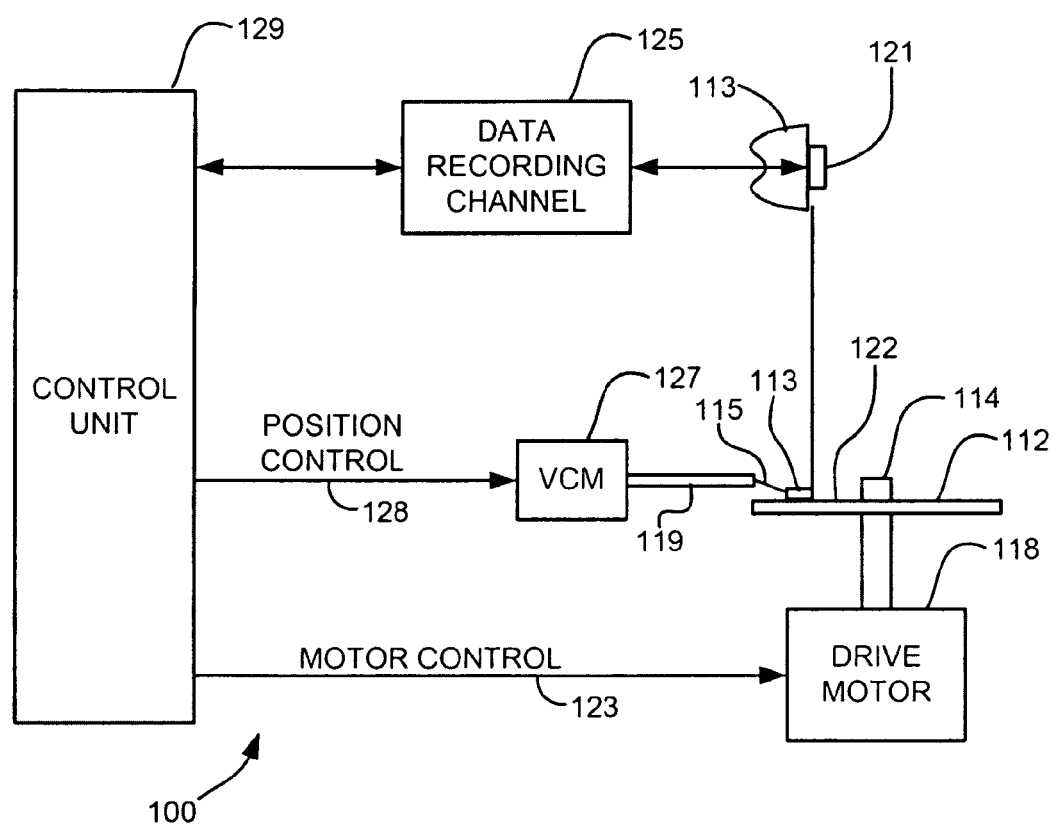
FIG. 1 is a simplified drawing of a magnetic recording disk drive system.

In still another general embodiment, a magnetic storage system comprises magnetic media; and at least one head for reading from and writing to the magnetic media, each head having a sensor and a writer. The writer includes a pole; a first layer of a nonmagnetic material over two sides of the pole, the first layer being substantially absent from above a top of the pole; an overlayer of an etchable or millable material positioned along the two sides of the pole, the overlayer being substantially absent from above the top of the pole, wherein a ratio of a thickness of the first layer to a thickness of the overlayer is less than about 5:1. The system also includes a slider for supporting the head; and a control unit coupled to the head for controlling operation of the head Referring now to FIG. 1, there is shown a disk drive 100 in accordance with one embodiment of the present invention. As shown in FIG. 1, at least, one rotatable magnetic disk 112 is supported on a spindle 114 and rotated by a disk drive motor 118. The magnetic recording on each disk is in the form of an annular pattern of concentric data tracks (not shown) on the disk 112.

At least one slider 113 is positioned near the disk 112, each slider 113 supporting one or more magnetic read/write heads 121. As the disks rotate, slider 113 is moved radially in and out over disk surface 122 so that heads 121 may access different tracks of the disk where desired data are recorded. Each slider 1.13 is attached to an actuator arm 119 by means of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 are for representation purposes only. It should be apparent that disk storage systems may contain a large number of disks and actuators, and each actuator may support a number of sliders.

An interface may also be provided for communication between the disk drive and a host (Integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back, gap. The flare point is where the second pole piece begins to widen (flare) to form the yoke. The placement of the flare point directly affects the magnitude of the magnetic field produced to write information on the recording medium. Since magnetic flux decays as it travels down the length of the narrow second pole tip shortening the second pole tip will increase the flux reaching the recording media. Therefore, performance can be optimized by aggressively placing the flare point close to the ABS.

Figure 2E:
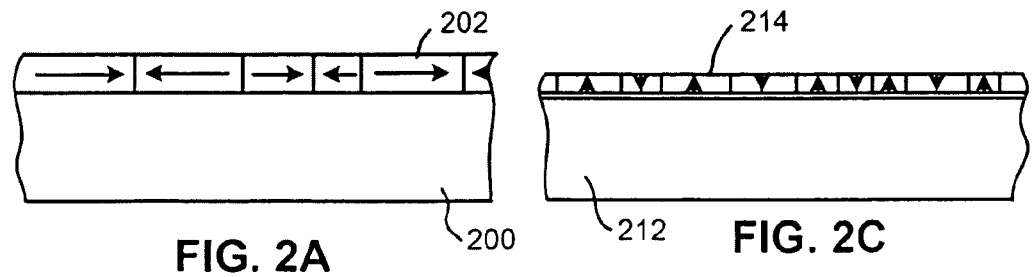
FIG. 2E is a schematic representation of the recording apparatus, similar to that of FIG. 2D, but adapted for recording separately on both sides of the medium.
Figure 2E:
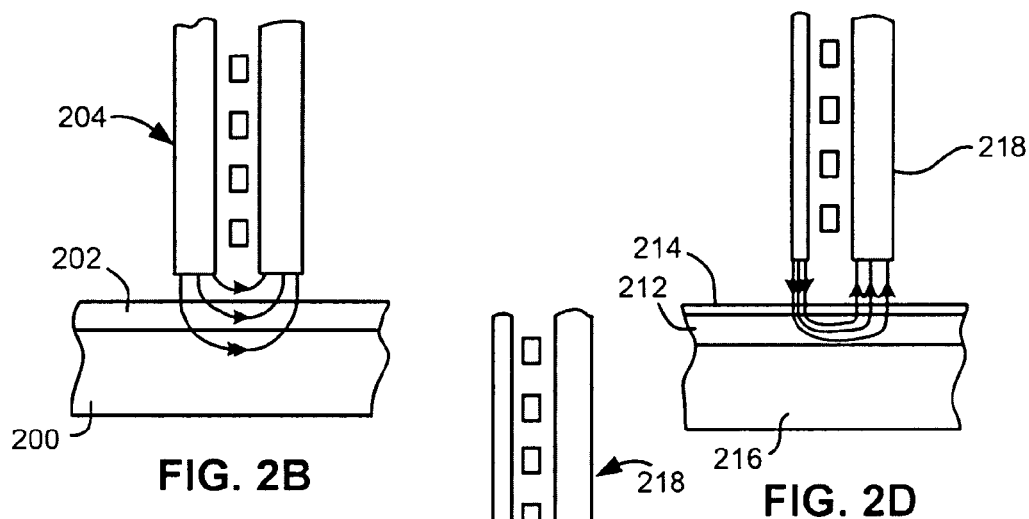
Figure 2E:
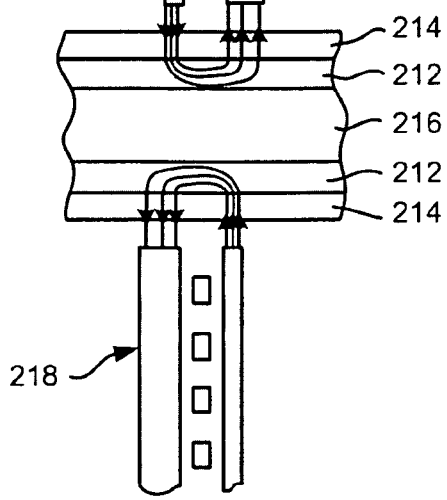
Figure 3A:
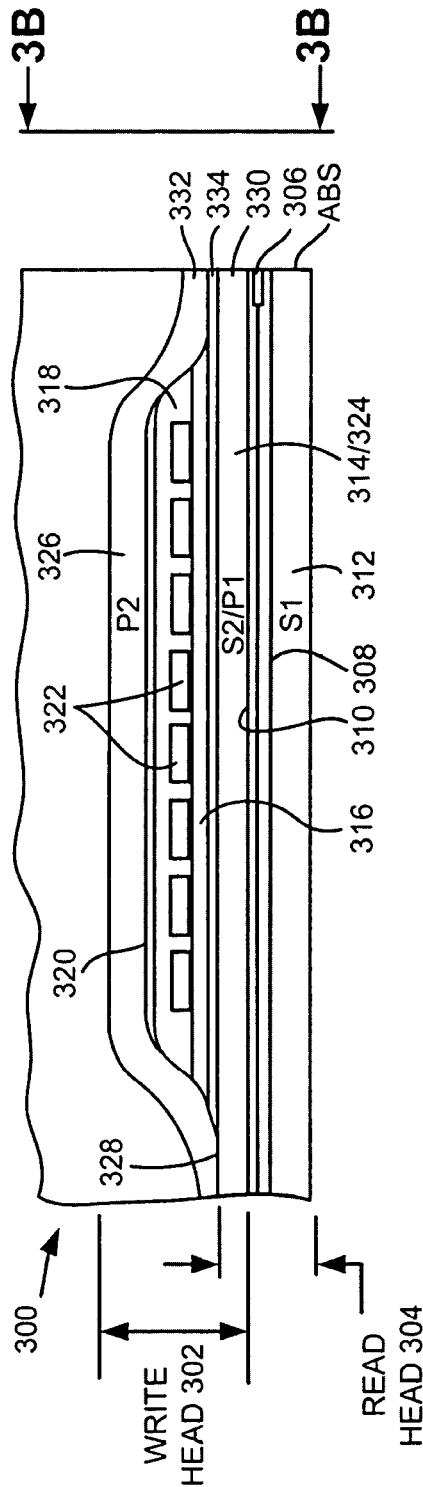
FIG. 3A is a partial, view of a merged magnetic head.

FIG. 2A illustrates, schematically, a conventional recording medium such as used with conventional magnetic disc recording systems, such as that shown in FIG. 3A. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates schematically the orientation of magnetic impulses substantially perpendicular to the surface of the recording medium. For such perpendicular recording the medium includes an under layer 212 of a material having a high magnetic permeability. This under layer 212 is then provided with an overlying coating 214 of magnetic material preferably having a high coercivity relative to the under layer 212.

Two embodiments of storage systems with perpendicular heads 218 are illustrated in FIGS. 2C and 2D (not drawn to scale). The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

By this structure the magnetic lines of flux extending between the poles of the recording head loop into and out of the outer surface of the recording medium coating with the high permeability under layer of the recording medium causing the lines of flux to pass through the coating in a direction generally perpendicular to the surface of the medium to record information in the magnetically hard coating of the medium in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium.

Figure 3B:
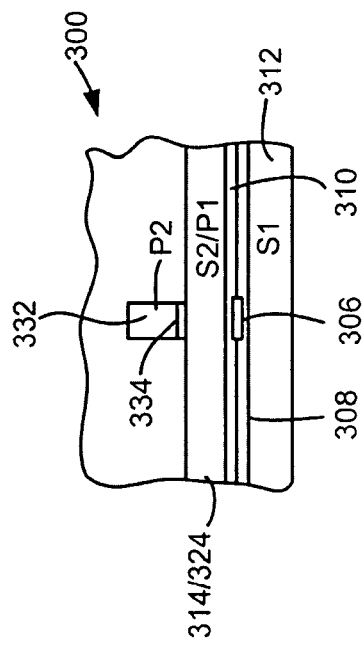
FIG. 3B is a partial air bearing surface (ABS) view, not to scale, of the slider taken along plane 3B-3B of FIG. 3A.

FIG. 3A is a side cross-sectional elevation view of a merged magnetic head 300, which includes a write head portion 302 and a read head portion 304, the read head portion employing a spin valve sensor 306. FIG. 3B is an ABS view of FIG. 3A. The spin valve sensor 306 is sandwiched between nonmagnetic electrically insulative first and second read gap layers 308 and 310, and the read gap layers are sandwiched between ferromagnetic first and second shield layers 312 and 314. In response to external magnetic fields, the resistance of the spin valve sensor 306 changes. A sense current ($I_s$) conducted through the sensor causes these resistance changes to be manifested as potential changes. These potential changes may then be processed as readback signals by processing circuitry (e.g. processing circuitry of the control unit 129 shown in FIG. 1).

The write head portion 302 of the magnetic head 300 includes a coil layer 322 sandwiched between first and second insulation layers 316 and 318. Note that the coils 322 are only partially shown, additional portions thereof being present outside the diagram. A third insulation layer 320 may be employed for planarizing the head to eliminate ripples in the second insulation layer caused by the coil layer 322. The first, second and third insulation layers are referred to in the art as an "insulation stack".

The coil layer 322 and the first, second and third insulation layers 316, 318 and 320 are sandwiched between first and second pole piece layers 324 and 326. The first and second pole piece layers 324 and 326 are magnetically coupled at a back gap 328 and have first and second pole tips 330 and 332 which are separated by a write gap layer 334 at the ABS. Since the second shield layer 314 and the first pole piece layer 324 are a common layer this head is known as a merged head. In a piggyback head, an insulation layer is located between a second shield layer and a first pole piece layer. First and second solder connections (not shown) connect leads (not shown) from the spin valve sensor 306 to leads (not shown) on the slider 113 (FIG. 1), and third and fourth solder connections (not shown) connect leads (not shown) from the coil 322 to leads (not shown) on the suspension.

Perpendicular head technology gives significant higher data storage density than longitudinal heads, though the approaches disclosed herein are applicable to both types. During the fabrication of such heads, writer and shield dimension control is a key aspect to consider. In some embodiments, a wrap around shield (WAS) may be used in conjunction with such heads. It is desirable to control the spacing of the WAS from the nearest pole. This is primarily accomplished by carefully controlling the topography and thickness of the gap positioned between the pole and the WAS.

Atomic layer deposition (ALD) of the gap between the pole and the WAS has been found to provide a very uniform thickness of film deposited over the topography of the underlying structure. However, ALD is very slow and expensive. Therefore, several methods are proposed for achieving comparable uniformity over topography matching to ALD, but using a combination of processes. Such methodology, while especially useful for defining a gap layer for WAS fabrication, may be used in conjunction with many other processes and uses. For clarity and to aid the understanding of the reader, much of the following description shall be made in terms of formation, of a gap layer over a pole, it being understood that this should in no way limit the inventive teachings herein.

In one particularly preferred approach, ALD is combined with another type of deposition to deposit, a combination film. This provides the benefits of ALD, while reducing the ALD deposition thickness requirements.

The following assumes that the underlying structure, e.g., a magnetic pole, has already been formed. However, for completeness, one method, of forming a structure is provided.

Figure 4:
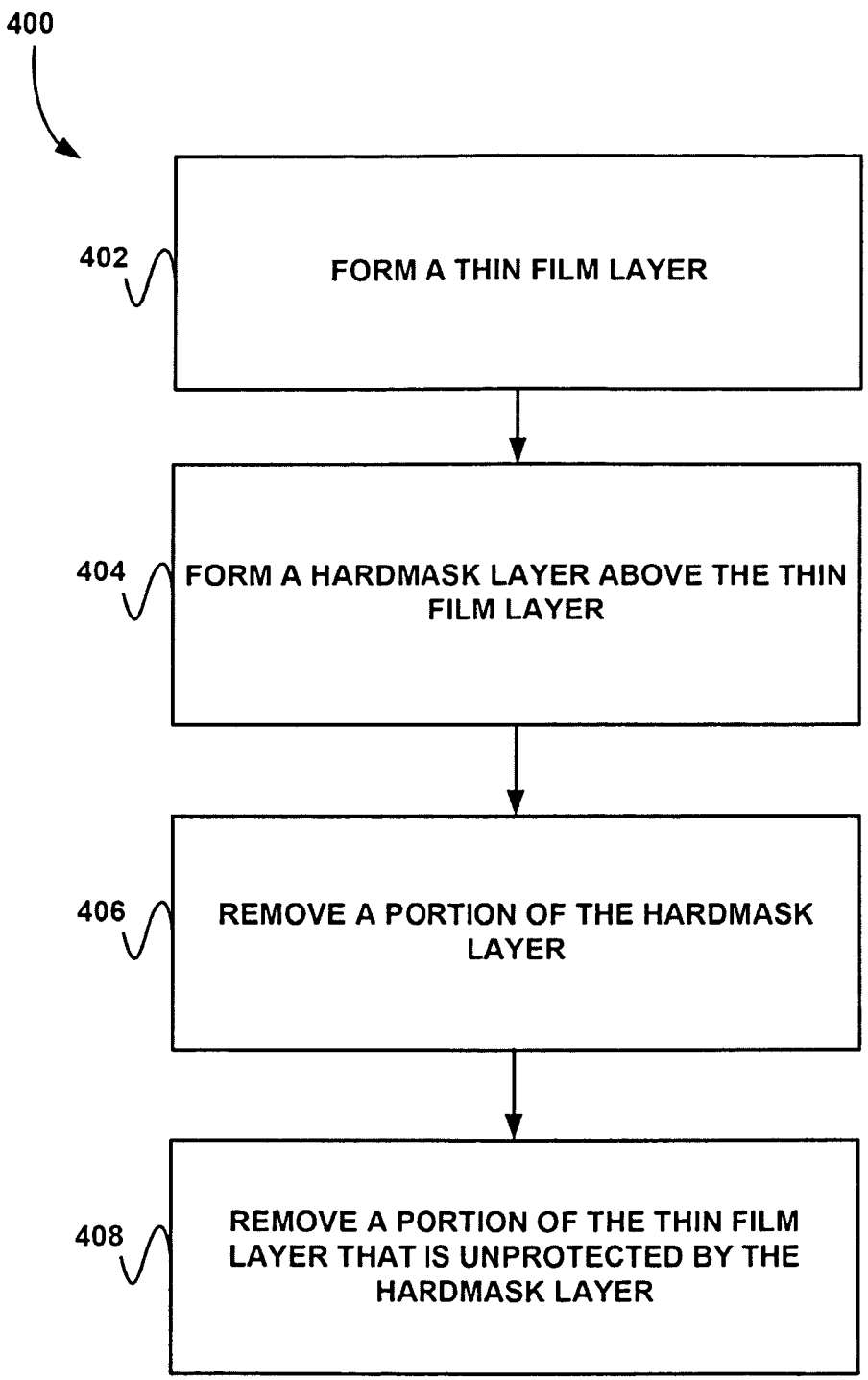
FIG. 4 shows a method for fabricating a magnetic structure using a diamond-like carbon (DLC) hardmask, in accordance with one embodiment.

In general, one approach to main pole formation for perpendicular heads is to ion mill through a hardmask into a laminate film. This technique is most effective when used with a high milling resistant material for track width control and bevel angle control. FIG. 4 shows a method 400 for fabricating a magnetic structure using a hardmask, in accordance with one embodiment. As shown, a thin film layer is formed. See operation 402. Additionally, a hardmask layer is formed above the thin film layer. The hardmask may include diamond-like carbon. See operation 404.

As further shown in FIG. 4, a portion of the hardmask layer is removed. See operation 406. In one embodiment, removing the portion of the hardmask layer may include forming a patterned protective layer above the hardmask layer, and performing a fluorine-based reactive ion etching on exposed portions of the hardmask layer. In another embodiment, removing the portion of the hardmask layer may include forming a patterned protective layer above the hardmask layer, and performing an oxygen-based ion milling on exposed portions of the hardmask layer.

A portion of the thin film layer that is unprotected by the hardmask layer is removed. See operation 408. The portion of the thin film layer may be partially or folly removed using any number of techniques. For example, the portion of the thin film layer may be removed by milling (e.g., ion milling,).

In one embodiment, the hardmask may be formed directly on the thin film layer. For example, the thin film layer may include a magnetic material, and the hardmask may be formed directly on the thin film layer. In this case, after removing the unprotected portion of the thin film layer, the hard mask layer may be removed. In other embodiments, a portion of the hard mask layer may remain.

Figure 5:
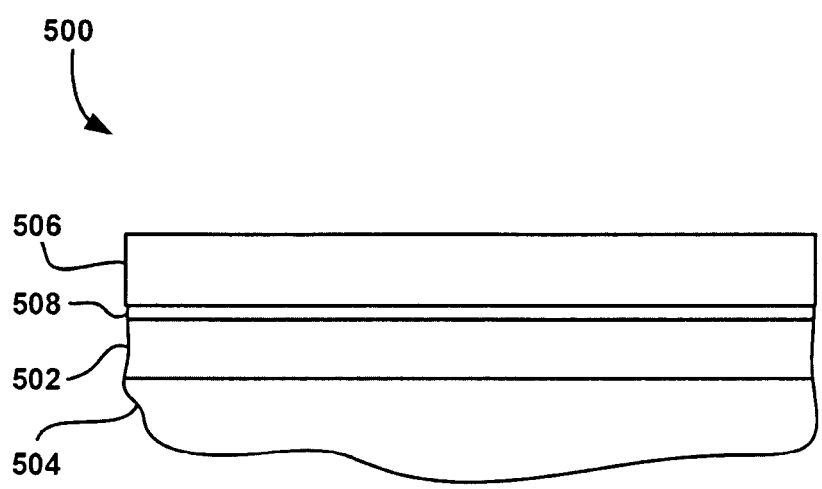
FIG. 5 is an ABS view of a magnetic structure, not to scale, being formed in accordance with one embodiment.

FIG. 5 is an ABS view of a structure 500 formed during a process for forming a magnetic structure such as a perpendicular pole tip, in accordance with one embodiment. For clarity and ease of understanding, the following description shall refer to creation of a pole tip, it being understood by one skilled in the art that the processes can be adapted with little or no modification to form magnetic and other structures for various uses. It is also assumed that one can form additional poles and coil layers at different points in the process.

As shown in FIG. 5, a magnetic pole tip layer 502 is formed on a layer of nonmagnetic material 504 such as $Al_2O_3$. The pole tip layer 502 may be formed of any suitable magnetic material including NiFe, CoFe, laminates, etc. A thin hardmask layer 508, e.g., of Ir, Ru, Rh, NiCr, Al2O3, Ta, TaO, SiN, SiO2, or any other suitable nonmagnetic material, may be deposited over layer 502, and will serve as an etch stop layer or etch end point detection layer in the illustration of processes later. As shown further, a DLC hardmask 506 is formed above the hardmask layer 508.

Figure 6:
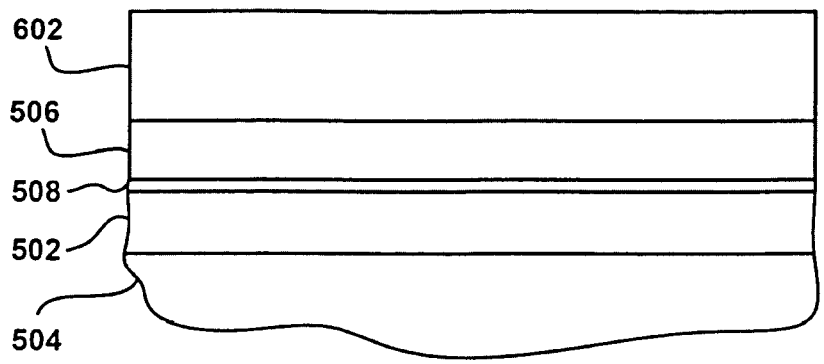
FIG. 6 is an ABS view of the magnetic structure of FIG. 5, not to scale, upon further processing.

As depicted in FIG. 6, a layer of a polyimide precursor polymer 602 may be spun onto the structure of FIG. 5. One potential polyimide precursor polymer is DURIMIDE®, sold by Arch Chemicals Inc., 501 Merritt 7, P.O. Box 5204, Norwalk, Conn., 06856-5204, USA, though any type may be used. Note also that instead of a polyimide precursor polymer, other material that upon curing (e.g., baking) forms a material that is polyimide-like may also be used. For clarity, the remaining discussion shall refer to a polyimide precursor polymer, it being understood that this term includes polymers capable of forming polyimides and polyimide-like materials. The polyimide precursor polymer 602 may be hard baked to cure the polymer 602, forming the polyimide or polyimide-like material.

Figure 7:
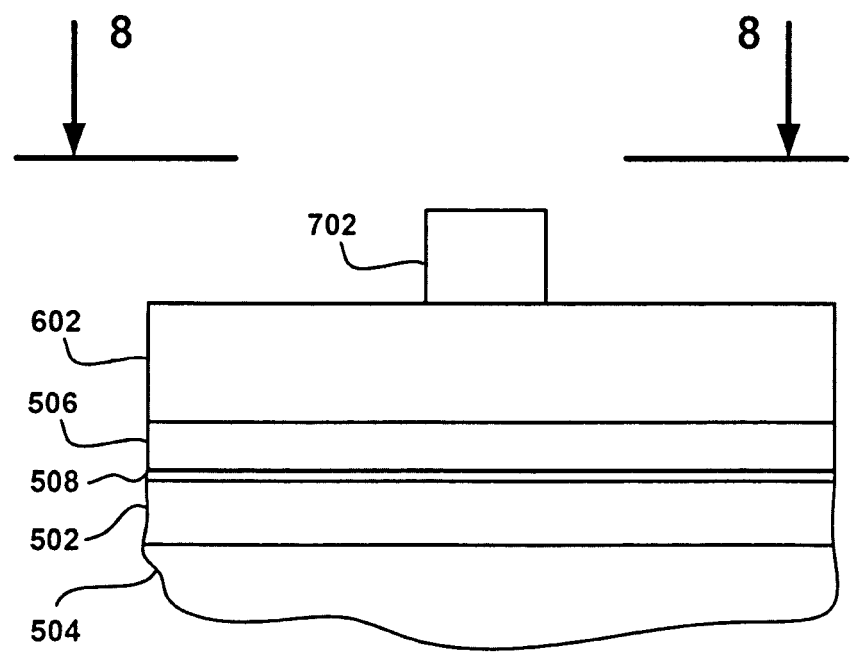
FIG. 7 is an ABS view of the magnetic structure of FIG. 6, not to scale, upon further processing.

Referring to FIG. 7, to form the desired shape of the cured polyimide precursor polymer 602, a silicon-containing resist layer 702 may be added and patterned to allow patterning of the cured polyimide precursor polymer 602. Photo-exposable or electron beam exposable Si-containing resists may be used. One potential Si-containing resist is an e-beam resist such as hydrogen silesquioxane (HSQ), sold by Dow Corning Corporation, Corporate Center, PO box 994, Midland, Mich., 48686-0994, USA. Note however, that any type of resist may be used.

Figure 8:
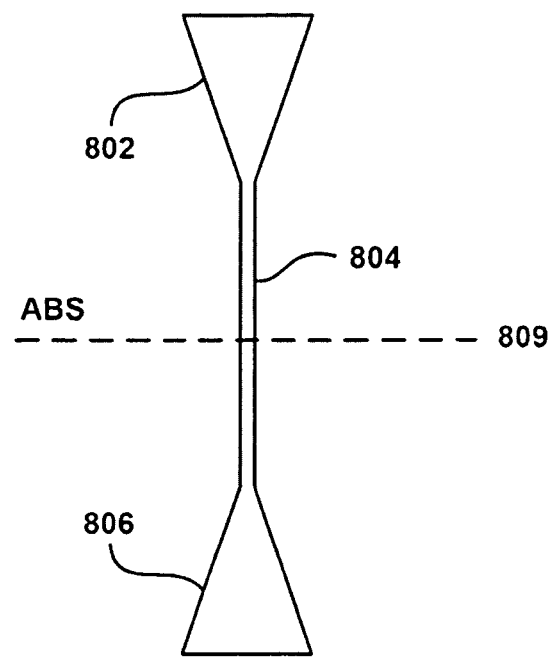
FIG. 8 is a top down depiction of the structure of FIG. 7.

FIG. 8 is a top down depiction of the structure of FIG. 7. As shown, the e-beam exposes an anchor pad 802, a line (pole) 804, and another anchor pad 806. The anchor pads 802, 806 may add stability to the pole 804 so that it is less likely to tip over during subsequent processing. In addition, the exposed surface (i.e., ABS) of the slider 809 may coincide with the pole.

Figure 9:
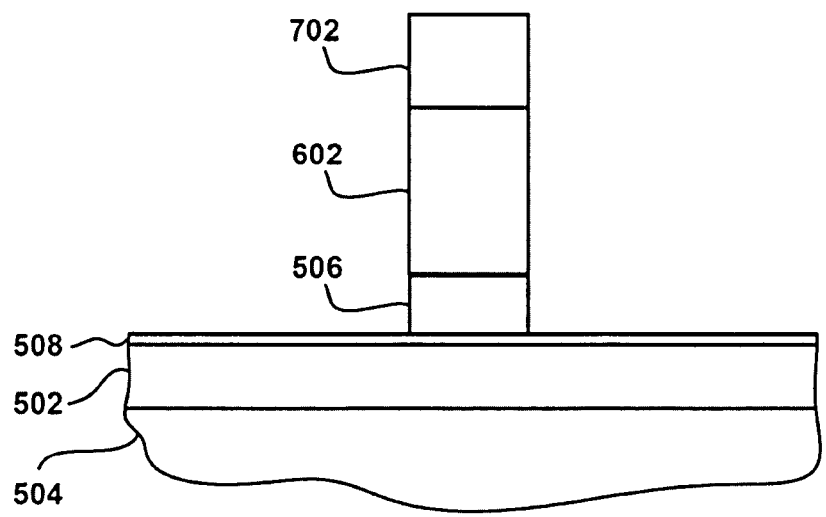
FIG. 9 is an ABS view of the magnetic structure of FIG. 7, not to scale, upon further processing.

The Si-containing resist. 702 may be exposed to an oxygen plasma, which converts the resist 702 to a material that is like glass, e.g., SiOx. The SiOx mask may then be used as a hard mask to RIE with an oxygen-containing plasma (e.g., $CO_2$ plasma) to form the polyimide stack, as shown in FIG. 9. In general terms, the resulting structure is an, e.g., a patterned DLC hardmask 506, a patterned polyimide layer, and a Si-containing mask on top of a polyimide layer.

Figure 10:
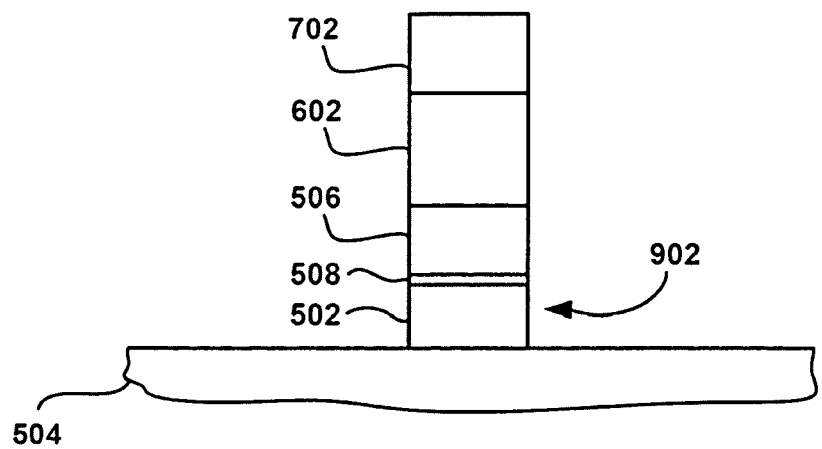
FIG. 10 is an ABS view of the magnetic structure of FIG. 9, not to scale, upon further processing.

The structure of FIG. 9 may then be milled, such as by ion beam milling or other techniques (e.g. $CF_4/O_2$ RIE or Ar/O RIE), to remove the exposed portions of the pole tip layer 502 and hardmask layer 508 thereby forming the pole tip 902. The resulting structure is shown in FIG. 10. Although the structure in FIG. 10 illustrates the resist 702 and the cured polyimide precursor polymer 602, the ion beam milling or other techniques may have removed all or a substantial portion of such layers. Additionally, subsequent processing may optionally be used to remove any remaining resist 702 and/or cured polyimide precursor polymer 602.

Figure 11:
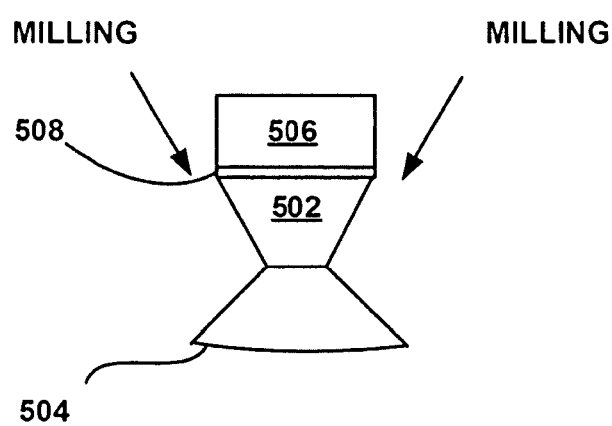
FIG. 11 is an ABS view of the magnetic structure of FIG. 10, not to scale, upon further processing.

The structure of FIG. 10 may then be milled, such as by ion beam milling (e.g. Ar ion milling), removing a portion of the pole tip layer 502 at an angle (e.g. about 10-89 degrees, etc.) on each side such that sidewalls of a remaining portion of the pole tip layer 502 taper together at an end thereof away from the DLC hardmask 506, resulting in the structure shown in FIG. 11. In this way, the DLC hardmask 506 may be used to eliminate the rounding of edges of the pole tip layer 502 near the interface with the DLC hardmask 506 during the ion beam milling process.

Subsequent to the ion beam milling, the remaining DLC hardmask 506 may be removed from the structure of FIG. 11.

After removing the unprotected portion of the thin film layer, a layer of gap material is formed over and along sides of the thin film layer according to the methodology presented herein. In one approach, after forming the layer of gap material, a portion of the gap material may be removed for exposing the hardmask layer, and the hardmask layer is removed.

Figure 12:
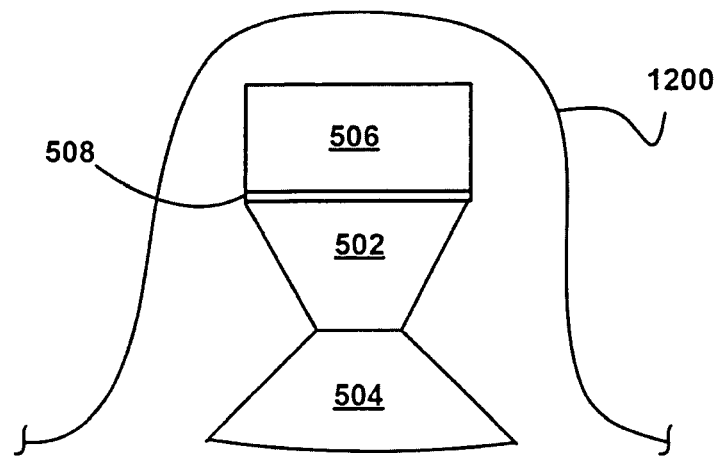
FIG. 12 is an ABS view of the magnetic structure of FIG. 11, not to scale, upon further processing.

Referring to FIG. 12, a layer of nonmagnetic material 1200 is formed over and along sides of the pole tip layer 502, e.g., by atomic layer deposition or other process that provides high-conformity to the underlying topography and uniform thickness. In a particularly preferred approach, ALD is used to form the layer of nonmagnetic material 1200. Again, ALD is a very slow, very conformal process, i.e., the deposited material conforms very closely to the topography of the surface being covered. In one embodiment, the layer of nonmagnetic material 1200 may include a metal oxide such as aluminum oxide, tantalum oxide, etc.

Figure 13:
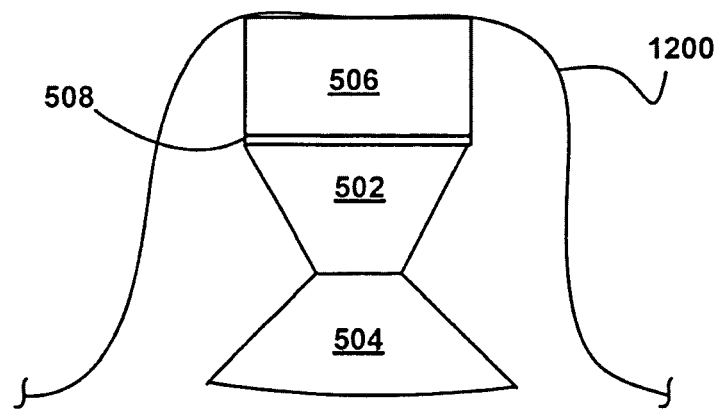
FIG. 13 is an ABS view of the magnetic structure of FIG. 12, not to scale, upon further processing.

After forming the layer of nonmagnetic material 1200, a portion of the nonmagnetic material may then be removed for exposing the DLC hardmask 506, as shown in FIG. 13. The top portion of the nonmagnetic material 1200 may be removed by ion milling, which may tend to selectively remove the top portion of the nonmagnetic material 1200. This will provide a process to achieve a thin top shield gap for a trailing shield perpendicular writer.

Figure 14:
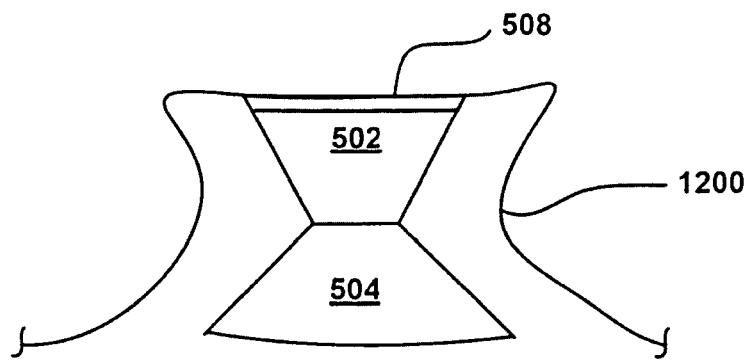
FIG. 14 is an ABS view of the magnetic structure of FIG. 13, not to scale, upon further processing.

The DLC hardmask 506 may then be removed (e.g. using $O_2$ RIE or CO2 RIE), resulting in the structure shown in FIG. 14. In this way, the layer 508 will be exposed leaving a portion of the nonmagnetic material 1200, which may optionally serve as a side shield gap for a wrap around shield in a perpendicular writer.

Note that the layer of nonmagnetic material 1200 is only a portion of the target thickness of the sidegap. Following are several processes for adding an overlayer to achieve a desired sidegap thickness.

Illustrative RIB Approach 1

For the present example, assume the target sidegap thickness is 120 nm. Further, assume that the nonmagnetic material 1200 has been formed to about 90 nm by ALD. To complete the remaining 30 nm of the sidegap, another tool with lower cost is used.

Figure 15:
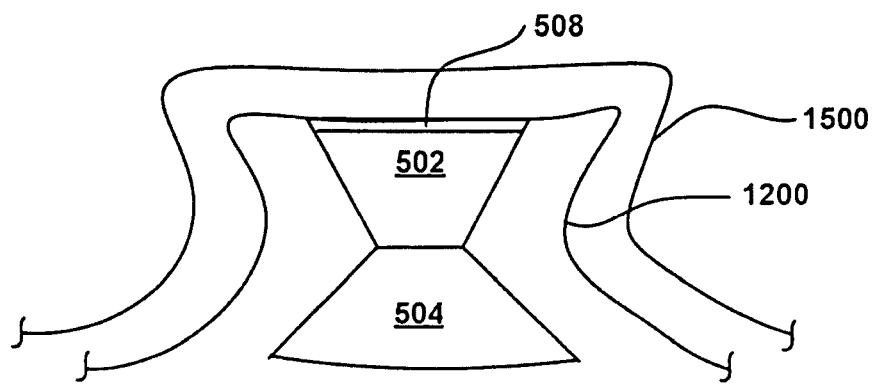
FIG. 15 is an ABS view of the magnetic structure of FIG. 14, not to scale, upon further processing.

Referring to FIG. 15, an overlayer 1500 is formed over the structure of FIG. 14. Particularly, the structure of FIG. 14 is coated with a nonmagnetic, etchable material such as Ta, TaO, $Ta_2O_5$, SiC, alumina, etc. using a lower cost method relative to ALD. Using the above-mentioned illustrative dimensions, the overlayer 1500 is deposited to about 60 nm thick on top, which results in about 30 nm of overlayer 1500 on each side after processing is complete.

Illustrative methods for forming the overlayer 1500 include ion beam deposition (IBD), plasma vapor deposition (PVD), sputtering, and photochemical deposition (PCD), etc.

As also shown in FIG. 15, preferably, an etch stop layer 508 is formed over the pole from previous milling process, for reasons which will soon become apparent.

Figure 16:
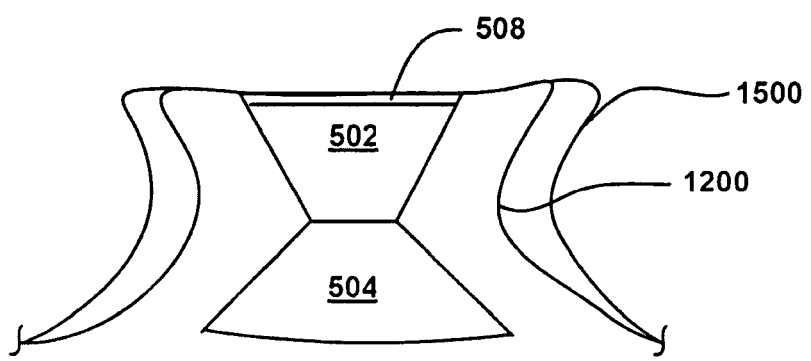
FIG. 16 is an ABS view of the magnetic structure of FIG. 15, not to scale, upon further processing.

Referring to FIG. 16, the overlayer 1500 is etched for substantially removing the overlayer 1500 from above layer 508. As shown, a substantial portion of the overlayer remains along the two sides of the structure after the etching.

The etching may include reactive ion etching (RIE) with or without endpoint. Illustrative RIE techniques include fluorine-based etching, such as $CF_4$ etching. The endpoint may be defined, at least in part by an etch-resistant hardmask or the etch stop layer 508, e.g., of SiN, $SiO_2$, $Al_2O_3$, etc.

An optional cap layer, e.g., of CoFe, NiFe, CoNiFe, can be added. Further, as described below, a WAS seed layer (if desired or needed) can be formed, and the WAS plated or otherwise deposited using known techniques.

Illustrative RIE Approach 2

For the present example, assume the target sidegap thickness is 120 nm. Further, assume that the nonmagnetic material 1200 has been formed to about 90 nm by ALD. To complete the remaining 30 nm of the sidegap, another tool with lower cost is used.

Fluorine based etching may erode the corners of alumina if used as the nonmagnetic material 1200. To avoid this, the following approach may be used.

Figure 17:
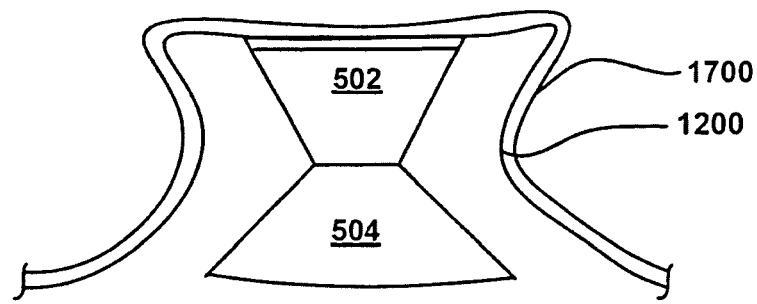
FIG. 17 is an ABS view of the magnetic structure of FIG. 14, not to scale, upon further processing.

Referring to FIG. 17, an etch stop layer 1700 is formed over the structure of FIG. 14. Particularly, the structure of FIG. 14 is coated with an etch stop layer of an etch-resistant material such as NiCr, Ru, Ir, Rh, Cr, etc. using any known deposition method (e.g., IBD, PVD, sputtering, PCD etc.)

Figure 18:
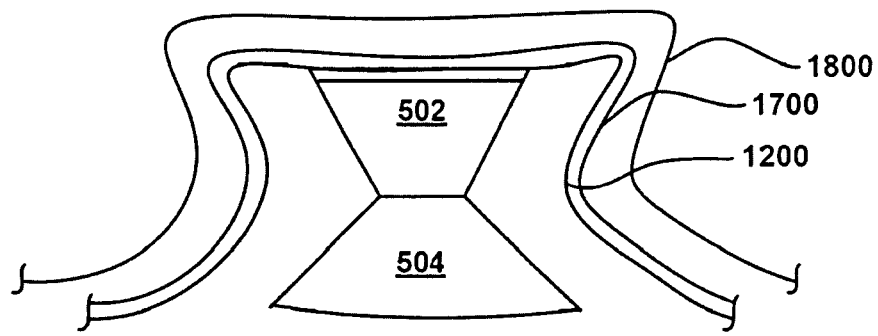
FIG. 18 is an ABS view of the magnetic structure of FIG. 17, not to scale, upon further processing.

The structure of FIG. 17 is coated with an overlayer 1800 of a nonmagnetic, etchable material such as Ta, TaO, SiC, alumina, etc. using a lower cost method relative to ALD. See FIG. 18. Using the above-mentioned illustrative dimensions, the overlayer 1800 is deposited to about 60 nm thick on top, which results in about 30 nm of overlayer 1800 on each side after processing is complete.

Figure 19:
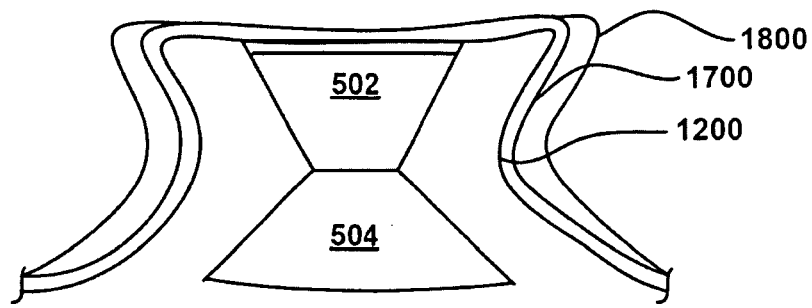
FIG. 19 is an ABS view of the magnetic structure of FIG. 18, not to scale, upon further processing.

Referring to FIG. 19, the overlayer 1800 is etched to the etch stop layer 1700, which serves as the endpoint, for substantially removing the overlayer 1800 from above the top of the pole 502. As shown, a substantial portion of the overlayer 1800 remains along the two sides of the structure after the etching.

The etching may include reactive ion etching (RIE). Illustrative RIE techniques include fluorine-based etching, such as $CF_4$ etching.

Art optional cap layer, e.g., of CoFe, NiFe, CoNiFe, can be added. Further, as described below, a WAS seed layer (if desired or needed) can be formed, and the WAS plated or otherwise deposited using known techniques.

Illustrative Ion Milling Approach.

For the present example, assume the target sidegap thickness is 120 nm. Further, assume that the nonmagnetic material 1200 has been formed to about 90 nm by ALD. To complete the remaining 20 nm of the sidegap, another tool with lower cost is used.

Figure 20:
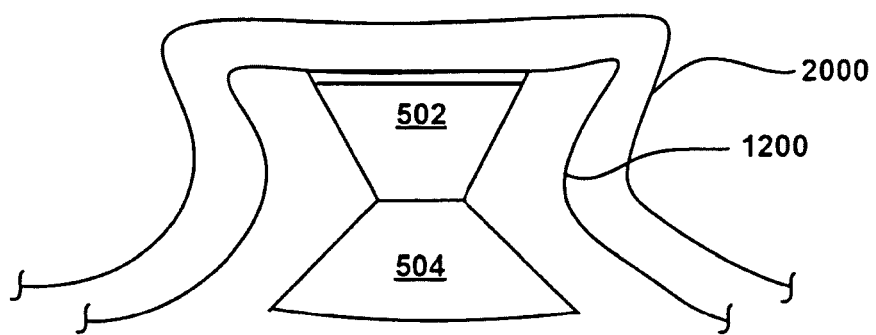
FIG. 20 is an ABS view of the magnetic structure of FIG. 14, not to scale, upon further processing.

Referring to FIG. 20, an overlayer 2000 is formed over the structure of FIG. 14. Particularly, the structure of FIG. 14 is coated with an overlayer 2000 of a nonmagnetic, millable material such as NiCr, Ru, Ir, Rh, Ta, Cr, etc. using a lower cost method relative to ALD. Using the above-mentioned illustrative dimensions, the overlayer 2000 is deposited to about 40 nm thick on top, which results in about 30 nm of overlayer 2000 on each side after processing is complete. It should be noted that, with milling, more material is redeposited on the sides, so the deposition thickness need not be as thick as in RIE approaches.

Illustrative methods for forming the overlayer 2000 include ion beam deposition (IBD), plasma vapor deposition (PVD), sputtering, and photochemical deposition (PCD), etc.

Figure 21:
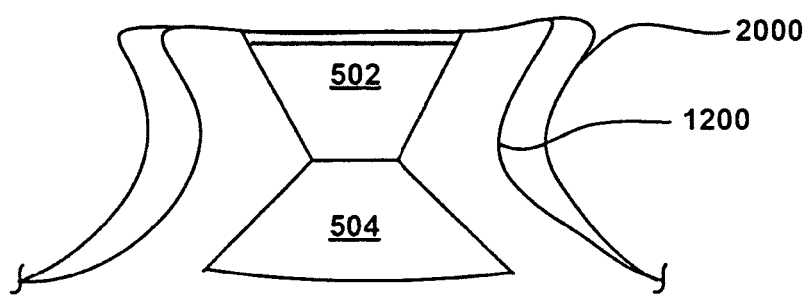
FIG. 21 is an ABS view of the magnetic structure of FIG. 20, not to scale, upon further processing.

Referring to FIG. 21, the overlayer 2000 is milled for substantially removing the overlayer 1500 from above the top of the pole 502. Preferably, the milling is stopped upon reaching the nonmagnetic material 1200. As shown, a substantial portion of the overlayer remains along the two sides of the structure after the milling.

An optional cap layer, e.g., of CoFe, NiFe, CoNiFe, can be added. Further, as described below, a WAS seed layer (if desired or needed) can be formed, and the WAS plated or otherwise deposited using known techniques. Note that the overlayer 2000 may act as at least part, of the WAS seed layer.

In any of the approaches above, the resulting overlayer is preferably greater than about 10 nm thick on each side, more preferably greater than about 20 nm thick. In some embodiments, a ratio of a thickness of the ALD deposited layer to a thickness of the overlayer after processing is about 5:1 or less, e.g., 2:1, 3:1 4:1, 5:1, etc.

Figure 22:
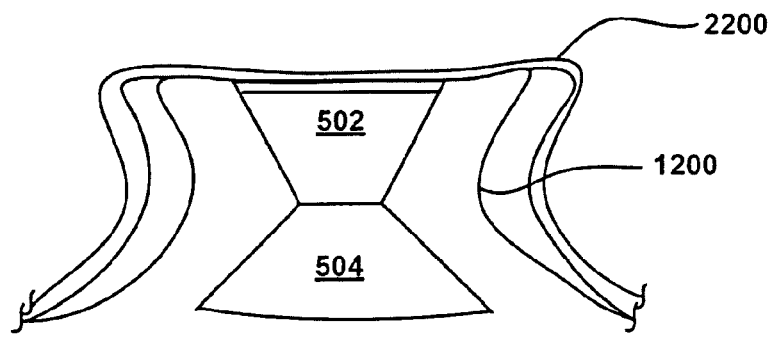
FIG. 22 is an ABS view of the magnetic structure of FIG. 16, not to scale, upon further processing.

In any of the approaches above, a seed layer may be formed over at least the overlayer (if desired or needed) using known techniques. For example, referring to FIG. 22, the structure of FIG. 16 is coated with a seed layer 2200.

Figure 23:
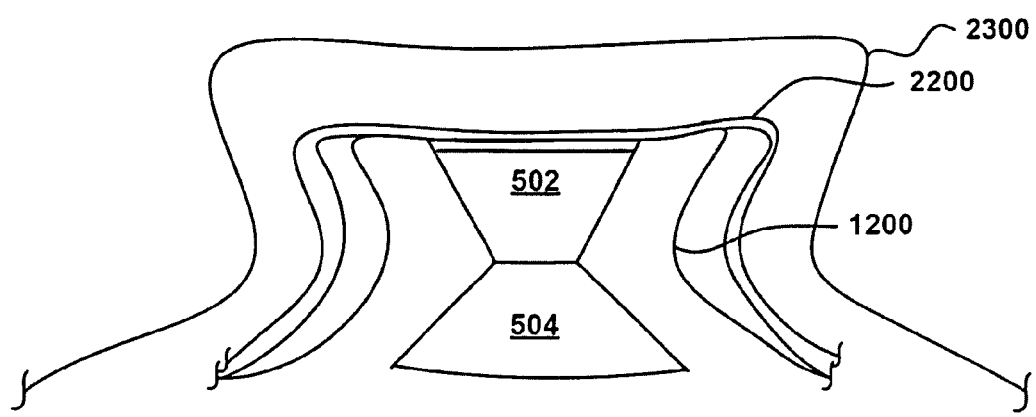
FIG. 23 is an ABS view of the magnetic structure of FIG. 22, not to scale, upon further processing.

A WAS may be plated on or otherwise deposited. For example, as shown, in FIG. 23, a magnetic. WAS 2300 may be electrically plated over the structure in FIG. 22.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    forming a first layer of a nonmagnetic material over two sides of a structure;
    depositing an overlayer of an etchable or millable, nonmagnetic material over the first layer and a top of the structure, the first layer being substantially absent from above the top of the structure prior to deposition of the overlayer; and etching or milling the overlayer for substantially removing the overlayer from above the top of the structure, wherein a substantial portion of the overlayer remains along the two sides of the structure after the etching or milling, wherein at least a portion of the top of the structure includes a hardmask layer and is exposed after the etching or milling.

2. A method as recited in claim 1, wherein the first layer is formed using atomic layer deposition, the first layer forming part of a gap adjacent the structure, the structure including a magnetic write pole.

3. A method as recited in claim 1, wherein the overlayer is deposited by at least one of: ion beam deposition, plasma vapor deposition, sputtering, and photochemical deposition.

4. A method as recited in claim 1, wherein the overlayer is of the etchable material, the etchable material being selected from a group consisting of Ta, TaO, $Ta_2O_5$, SiC, and $Al_2O_3$.

5. A method as recited in claim 1, wherein the structure is a magnetic pole, wherein the overlayer is deposited directly on the first layer.

6. A method as recited in claim 1, wherein a ratio of a thickness of the first layer to a thickness of the overlayer is less than about 5:1.

7. A method as recited in claim 1, further comprising depositing an etch stop layer over the structure and prior to forming the overlayer.

8. A method as recited in claim 7, wherein the etch stop layer is deposited over the structure prior to forming the first layer and the overlayer.

9. A method as recited in claim 1, further comprising forming a cap layer above the top of the structure.

10. A method as recited in claim 1, further comprising forming a seed layer over the overlayer.

11. A method as recited in claim 1, further comprising forming a wrap around shield over the overlayer.

12. A method as recited in claim 1, wherein the hardmask layer is being used as at least one of an etch stop layer and an end point detection layer during the etching.

13. A method as recited in claim 1, wherein the millable material is deposited by at least one of: ion beam deposition, plasma vapor deposition, sputtering, and photochemical deposition.

14. A method as recited in claim 1, wherein the hardmask layer is being used as at least one of an etch stop layer and an end point detection layer during the etching, wherein the first layer is formed using atomic layer deposition, wherein the overlayer is deposited by at least one of: ion beam deposition, plasma vapor deposition, sputtering, and photochemical deposition; the first layer and the overlayer forming at least a portion of a gap adjacent the structure, the structure including a magnetic write pole; further comprising forming a seed layer over the overlayer; and forming a wrap around shield over the seed layer by electrical plating.

15. A method as recited in claim 14, wherein the overlayer is deposited directly on the first layer.

16. A method, comprising:

forming a first layer of a nonmagnetic material over two sides of a structure;

depositing an overlayer of an etchable or millable, nonmagnetic material over the first layer and a top of the structure, the first layer being substantially absent from above the top of the structure prior to deposition of the overlayer; and etching or milling the overlayer for substantially removing the overlayer from above the top of the structure, wherein a substantial portion of the overlayer remains along the two sides of the structure after the etching or milling, wherein at least a portion of the top of the structure is exposed after the etching or milling; and forming an etch stop layer in direct contact with the top of the structure after the etching or milling.

* * * * *

UNITED STATES PATENT AND TRADEMARK OFFICE
CERTIFICATE OF CORRECTION

PATENT NO.        : 8,839,504 B2                                     Page 1 of 1
APPLICATION NO.   : 12/120129
DATED             : September 23, 2014
INVENTOR(S)       : Zheng It is certified that error appears in the above-identified patent and that said Letters Patent is hereby corrected as shown below:

In the specification:

col. 4, line 15 replace "1.13" with --113--;

col. 4, line 50 replace "(Integral" with --(integral--;

col. 7, line 15 replace "folly" with --fully--;

col. 7, line 64 replace "silesquioxane" with --silsesquioxane--;

col. 9, line 8 replace "RIB" with --RIE--;

col. 10, line 4 replace "Art" with --An--.

Signed and Sealed this
Third Day of March, 2015

Michelle K. Lee
*Deputy Director of the United States Patent and Trademark Office*